(12) United States Patent
Vasek et al.

(10) Patent No.: US 9,575,174 B2
(45) Date of Patent: Feb. 21, 2017

(54) SYSTEMS AND METHODS FOR FILTERING WINGTIP SENSOR INFORMATION

(71) Applicant: Honeywell International Inc., Morristown, NJ (US)

(72) Inventors: Jiri Vasek, Brno (CZ); Pavel Kolcarek, Brno (CZ); Olukayode Olofinboba, Eden Prairie, MN (US)

(73) Assignee: Honeywell International Inc., Morris Plains, NJ (US)

( * ) Notice: Subject to any disclaimer, the term of this patent is extended or adjusted under 35 U.S.C. 154(b) by 349 days.

(21) Appl. No.: 13/741,291

(22) Filed: Jan. 14, 2013

(65) Prior Publication Data

US 2013/0321193 A1    Dec. 5, 2013

Related U.S. Application Data

(60) Provisional application No. 61/653,297, filed on May 30, 2012, provisional application No. 61/706,632, filed on Sep. 27, 2012.

(51) Int. Cl.

| | | |
|---|---|---|
| *G01S 13/93* | (2006.01) | |
| *G01S 7/04* | (2006.01) | |
| *G01S 13/04* | (2006.01) | |
| *G01S 17/93* | (2006.01) | |
| *G01S 7/51* | (2006.01) | |
| *G08G 5/00* | (2006.01) | |
| *G08G 5/04* | (2006.01) | |
| *G08G 5/06* | (2006.01) | |

(52) U.S. Cl.
CPC ............ *G01S 13/93* (2013.01); *G01S 7/04* (2013.01); *G01S 7/51* (2013.01); *G01S 13/04* (2013.01); *G01S 13/931* (2013.01); *G01S 17/933* (2013.01); *G08G 5/0021* (2013.01); *G08G 5/0078* (2013.01); *G08G 5/045* (2013.01); *G08G 5/065* (2013.01); *G01S 2013/9335* (2013.01)

(58) Field of Classification Search
CPC ....... G08G 5/0021; G08G 5/065; G01S 13/93
USPC .................. 342/29, 36, 53; 701/301
See application file for complete search history.

(56) References Cited

U.S. PATENT DOCUMENTS 6,118,401 A * 9/2000 Tognazzini ............... G01S 7/04
                                                         342/29
7,579,980 B2   8/2009 Anderson et al.
(Continued)

OTHER PUBLICATIONS

Examination Report from counterpart European Patent Application No. 13165869.2, dated Nov. 21, 2014, 7 pp.
(Continued)

*Primary Examiner* — Marcus Windrich
(74) *Attorney, Agent, or Firm* — Shumaker & Sieffert, P.A.

(57) ABSTRACT

Systems and methods for providing improved situational awareness for an aircraft while taxiing. An exemplary method generates reflectivity data based on an associated emission at a transceiver located on an aircraft. At a processor, targets are determined if a portion of the generated reflectivity data is greater than a predefined threshold. Then, the analyzed targets are determined as to whether they are within a dynamically defined three-dimensional envelope. The envelope is based on wingtip light module speed and trajectory. On a display device, an indication of the nearest target is presented at the associated range to the nearest target.

20 Claims, 6 Drawing Sheets

(56) References Cited

U.S. PATENT DOCUMENTS

| | | | | |
|---|---|---|---|---|
| 7,903,023 B2* | 3/2011 | Cornic | .................. | G01S 13/44 342/118 |
| 7,932,838 B2* | 4/2011 | Hamza | .................. | G08G 5/06 340/507 |
| 2005/0007257 A1* | 1/2005 | Rast | .................. | B64D 47/04 340/815.45 |
| 2006/0287829 A1* | 12/2006 | Pashko-Paschenko | | B60Q 5/006 701/301 |
| 2008/0306691 A1* | 12/2008 | Louis | .................. | G08G 5/06 701/301 |
| 2009/0140925 A1* | 6/2009 | Smith | .................. | G01H 17/00 342/454 |
| 2009/0164122 A1* | 6/2009 | Morbey | .................. | G08G 5/0021 701/301 |
| 2009/0174591 A1 | 7/2009 | Cornic et al. | | |
| 2010/0219988 A1 | 9/2010 | Griffith | | |

OTHER PUBLICATIONS

Search Report from counterpart European Patent Application No. 13165869.2, dated Oct. 27, 2014, 3 pp.

Response to Examination Report dated Nov. 21, 2014, from Counterpart European Patent Application No. 13165869.2, dated Mar. 13, 2015, 19 pp.

First Office Action, and translation thereof, from counterpart Chinese Patent Application No. 201310205987.6, dated Apr. 1, 2016, 27 pp.

Examination Report from counterpart European Application No. 13165869.2, dated Apr. 8, 2016, 6 pp.

Response to Examination Report dated Apr. 8, 2016, from counterpart European Application No. 13165869.2, filed Jul. 18, 2016, 13 pp.

Examination Report from counterpart European Application No. 13165869.2-1812, dated Oct. 28, 2016, 7 pp.

* cited by examiner

SYSTEMS AND METHODS FOR FILTERING WINGTIP SENSOR INFORMATION

PRIORITY CLAIM

This application claims the benefit of U.S. Provisional Application Ser. No. 61/706,632, filed Sep. 27, 2012, the content of which is hereby incorporated by reference in its entirety. The entire content of U.S. Provisional Application Ser. No. 61/653,297, filed May 30, 2012, is also incorporated by reference herein.

BACKGROUND OF THE INVENTION

The Flight Safety Foundation (FSF) estimates the apron-damage costs to the world's airlines to be $4 billion every year. For corporate fleets, the damage-related cost was estimated to be $1 billion annually.

The presented apron-damage costs include direct costs resulting from material and work related to an accident, and indirect costs resulting from aircraft being not in operation, harming the public image of airlines, incident investigations, etc.

Three main causes of surface accidents were indentified from the NTSB database: the failure to maintain adequate visual lookout, the failure to perceive distance between the wings and obstacles, and the failure to maintain required clearance.

SUMMARY OF THE INVENTION

The present invention provides systems and methods for providing improved situational awareness for an aircraft while taxiing. An exemplary method generates reflectivity data based on an associated emission at a transceiver located at one or more wingtip light modules of an aircraft. The transceiver may be located in dedicated areas of the wingtip or other parts of the aircraft (e.g., engine, fuselage). At a processor, targets are determined if a portion of the generated reflectivity data is greater than a predefined threshold based on an algorithm used for calculation of the reflectivity and associated certainty. Then, the analyzed targets are determined as to whether they are within a dynamically defined three-dimensional envelope. The envelope is based on wingtip light module speed and trajectory. On a display device, an indication of the nearest target is presented at the associated range to the nearest target.

In one aspect of the invention, a first range overhead display is generated if the closest target is farther than a threshold distance from the aircraft. The first range overhead display includes an aircraft icon and one or more target cones beginning at the respective wingtip of the aircraft icon. A second range overhead display is generated if the closest target is farther than the threshold distance from the aircraft. The second range overhead display includes an aircraft icon and one or more target cones beginning at the respective wingtip of the aircraft icon.

In another aspect of the invention, the target cones of the first range overhead display have a greater range than the target cones of the second range overhead display.

In still another aspect of the invention, the target cones include range line(s) located previously designated distances from at least one of the aircraft or the associated wingtip.

In yet another aspect of the invention, the indication of the nearest target includes a highlighted range line of the cones that is associated with the nearest target reflectivity data or a distance value associated with the nearest target reflectivity data.

In still yet another aspect of the invention, the indication of the nearest target includes at least a partial outline of an airport structure associated with the nearest target reflectivity data. The outline of the airport structure is based on previously stored airport information.

BRIEF DESCRIPTION OF THE DRAWINGS

Preferred and alternative embodiments of the present invention are described in detail below, with reference to the following drawings:

FIGS. 4-1 and 4-2 are flow diagrams illustrating an exemplary process performed by the system shown in FIGS. 1 and 2; and FIGS. 5-1 and 5-2 are wingtip sensor images at two different ranges.

DETAILED DESCRIPTION OF THE INVENTION

Figure 1:
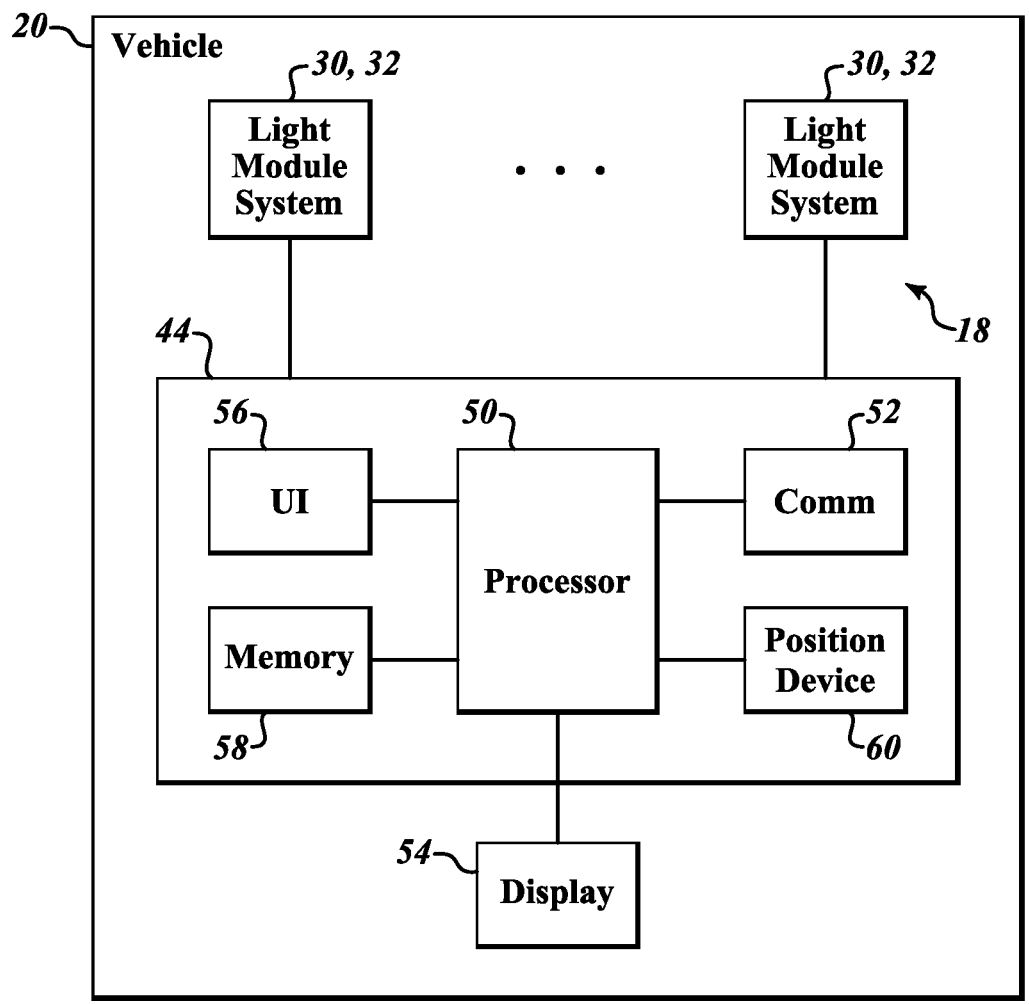
FIGS. 1 and 2 are diagrams of an exemplary system formed in accordance with an embodiment of the present invention.
Figure 2:
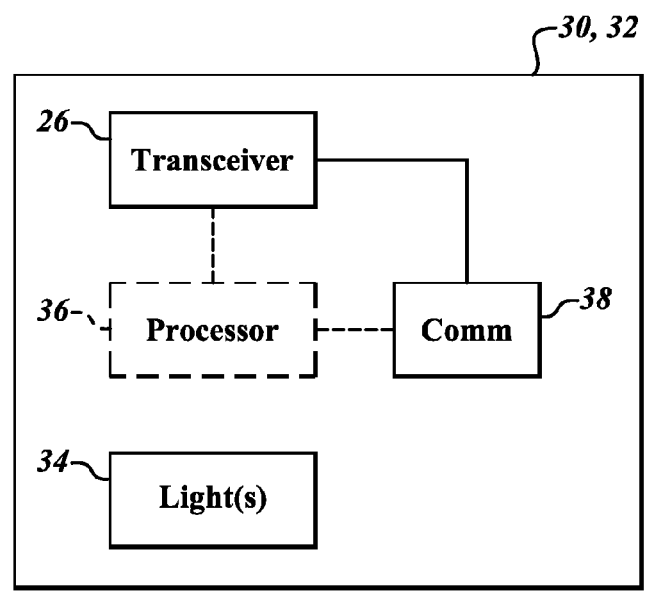
Figure 3:
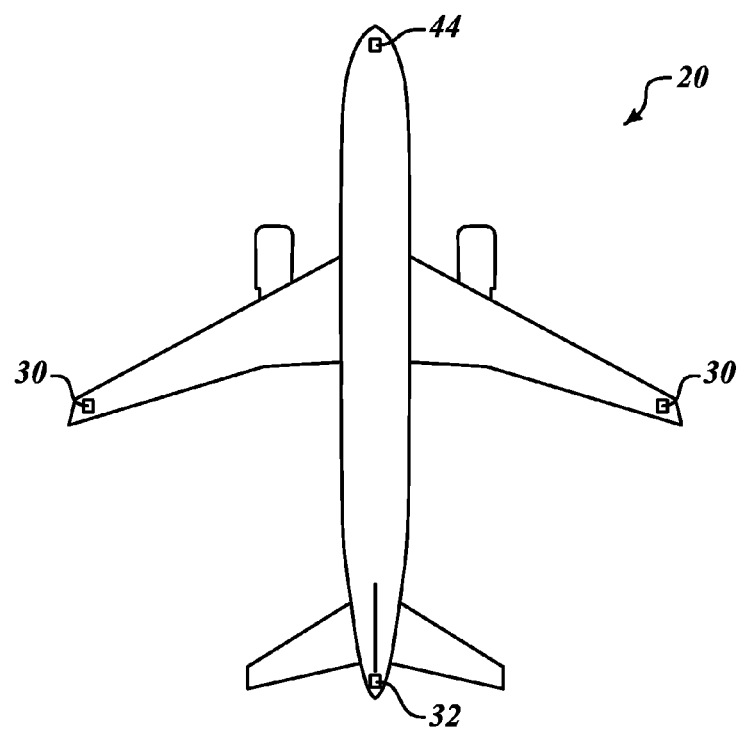
FIG. 3 is a top view of an aircraft implementing the system shown in FIGS. 1 and 2.

In one embodiment, as shown in FIGS. 1-3, an exemplary airport surface collision-avoidance system (ASCAS) 18 includes light module system(s) 30, 32 and a cockpit system 44. Each light module system(s) 30, 32 includes a transceiver (e.g., emitter/sensor (e.g., radar)) 26, one or more navigation/position lights 34, a processor 36, and a communication device 38. The transceiver 26 is in (wired or wireless) communication via the communication device 38 to the cockpit system 44.

In one embodiment, the cockpit system 44 includes a processor 50 (optional), a communication device (wired and/or wireless) 52, a display 54, a user interface (UI) device 56, memory 58, and a position device 60. The cockpit system 44 provides audio and/or visual cues (e.g., via headphones, display) based on sensor-derived and processed information.

Based on information from the sensors 26, the cockpit system 44 provides some or all of the following functions: detect and track intruders, evaluate and prioritize threats, and declare and determine actions. Once an alert associated with a detection has been produced, then execution of a collision-avoidance action (e.g., stop the aircraft, maneuver around intruder, etc.) is manually performed by the vehicle's operator, or automatically by an automation system (e.g., autobrakes).

In one embodiment, some or all of the processing of the sensor information is done by the processor 36 at the sensor level and/or the processor 50 at the cockpit system 44.

In one embodiment, situational awareness is improved by integration with an automatic dependent surveillance-broadcast/traffic information service-broadcast (ADS-B/TIS-B), airport/airline information on vehicles/aircraft/obstacles (e.g., through WiMax), and with synthetic vision system/electronic vision system/combined vision system (SVS/EVS/CVS) received by the respective devices using the communication devices 38, 52.

In one embodiment, the present invention reduces false alarms by exploiting flight plan and taxi clearance information and airport building/obstacle databases stored in the memory 58 or received from a source via the communication devices 38, 52.

The sensors 26 are included in the wing and tail navigation light module systems 30, 32 or are placed at other locations about the aircraft. The sensors 26 provide near-complete sensor coverage of the aircraft 20. Full coverage can be attained by placing sensors in other lights that are strategically located on the aircraft 20.

The pilot is alerted aurally, visually, and/or tactilely. For example, a visual alert presented on a display (e.g., an electronic flight bag (EFB) display) shows at least partial aircraft outline and/or highlights of any obstructions. Aural alerting can for instance be through existing installed equipment, such as the interphone or other warning electronics or possibly the enhanced ground proximity warning system (EGPWS) platform.

Figures 1, 4:
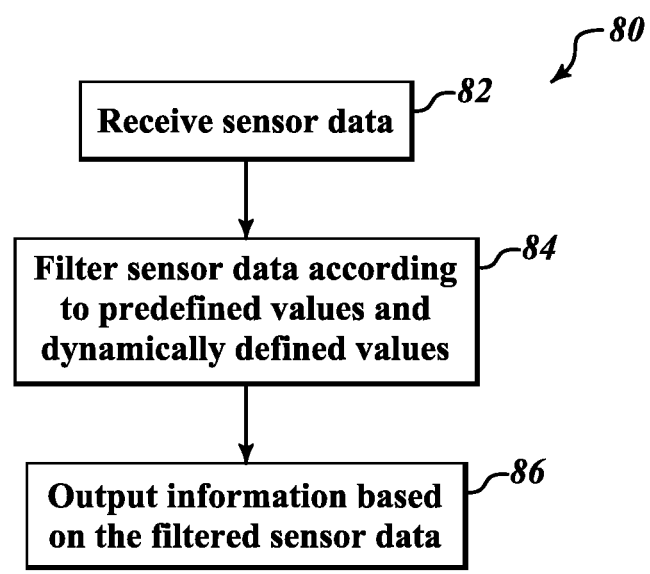
Figures 2, 4:
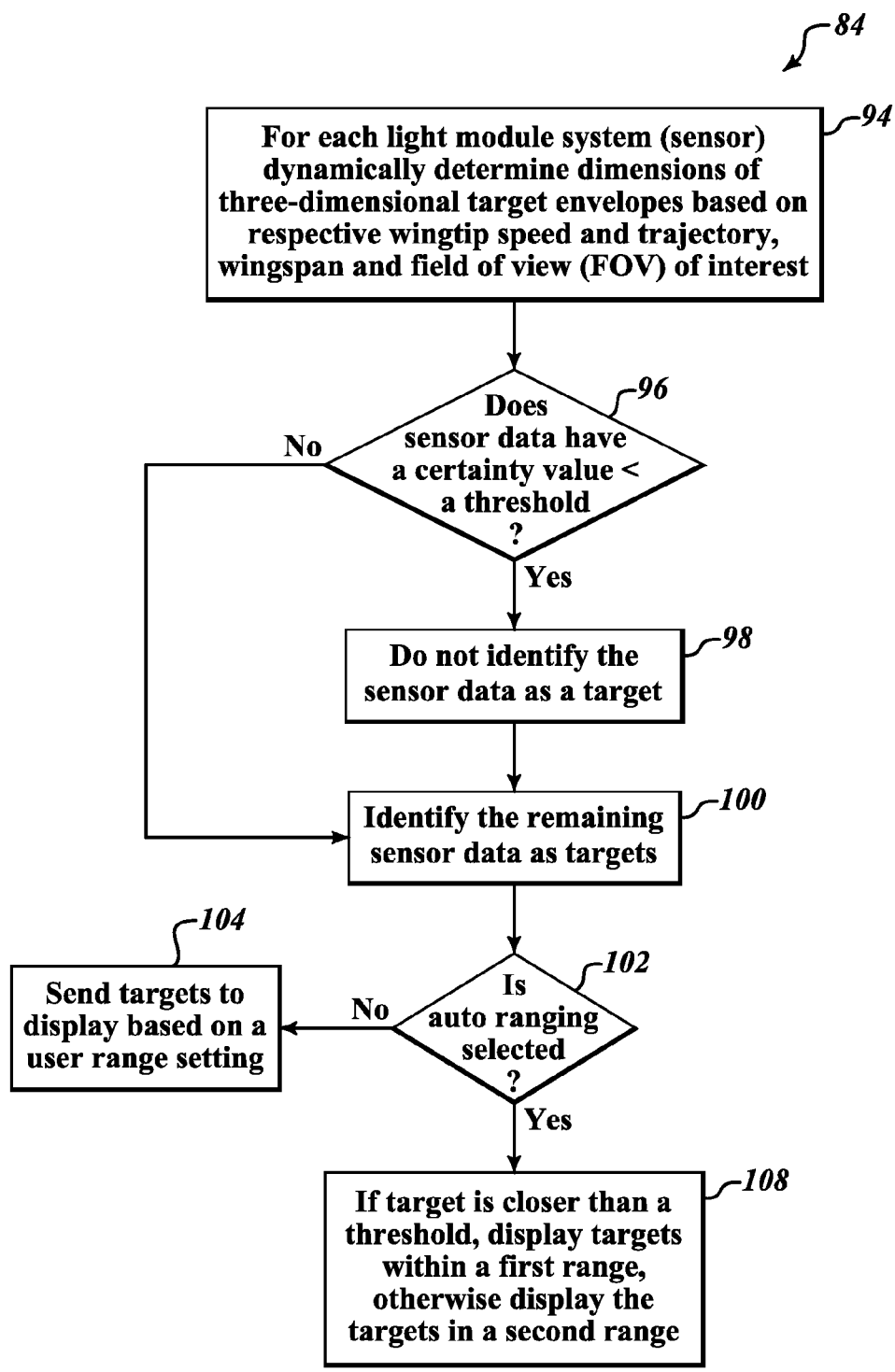

FIGS. 4-1 and 4-2 show an exemplary process 80 performed by the cockpit system 44 and/or the light module system(s) 30, 32. First, at a block 82, the transceivers 26 generate data based on reflections received at their sensors based on signals sent by their emitters. Next, at a block 84, the processor 50 filters the sensor data based on predefined values/parameters and/or dynamically defined values/parameters. Then, at a block 86, the processor 50 outputs target information based on the filtered sensor data. The steps not included are the transmission of information between the light module systems 30, 32 and the cockpit system 44.

FIG. 4-2 shows details of the step performed at block 84. First, at a block 94, the processor 50 dynamically determines dimensions of a sensor's three-dimensional envelope for each light module system (sensor) based on the speed of the light module system (i.e., wingtip speed) calculated from aircraft speed information, light module system trajectory information, and predefined vertical boundary information. The speed and trajectory information are derived from aircraft speed and trajectory information received from the position device 60.

At a decision block 96, the processor 50 determines whether the sensor (reflectivity) data that are within the sensor's three-dimensional envelope have a certainty value greater than a predefined threshold. If the certainty value is not greater than the predefined threshold, then those sensor data are not identified as a target/obstacle (i.e., filtered out), see block 98, otherwise the sensor data are identified as a target/obstacle (block 100).

After blocks 96, 98, the processor 50 determines whether a display setting is set at manual or automatic (decision block 102). If the display setting is manual, then, at a block 104, the processor 50 generates and sends targets/obstacles to the display 54 according to the identification at block 100 and a range setting set by a user of the UI device 56. If the display setting is automatic, then, at a block 108, the processor 50 outputs targets/obstacles from the set of identified targets/obstacles to the display at a first range value, if the closest target/obstacle is within a threshold distance. If the closest target/obstacle is not within the threshold distance, the processor 50 outputs the filtered target/obstacle at a second range value.

In one embodiment, the thresholds for sensor FOV of interest are assessed, based on maximum and minimum stopping distances.

Maximum Distance:
The braking action is executed by aircraft.
Aircraft is moving by the ground speed of 16 m/s, which corresponds to the maximum assumed taxi speed.
Aircraft is moving on wet-poor runway with airplane braking coefficient $\mu_B$=0.3.
Aircraft is producing zero lift.
No skid is assumed.
Minimum Distance:
The braking action is executed by aircraft.
Aircraft is moving by the ground speed of 1.4 m/s, which corresponds to the speed of the aircraft being pushed backward (fast human walk).
Aircraft is moving on wet-poor runway with airplane braking coefficient $\mu_B$=0.3.
Aircraft is producing zero lift.
No skid is assumed.

The following is an exemplary calculation of the braking distance. One may implement this calculation differently. Aircraft braking coefficient ($\mu_B$) includes a coefficient summarizing the retarding forces acting on a wheel under braking. In one embodiment, $\mu_B = F_{braking}/(mg-L)$. Definitions are: $F_{braking}$—braking force, m—aircraft mass, L—lift, g—gravitational acceleration. The aircraft braking coefficient is not equivalent to the tire-to-ground friction coefficient. The estimated airplane braking coefficient is an all-inclusive term that incorporates effects due to the runway surface, contaminants, and airplane braking system (e.g., antiskid efficiency, brake wear).

The resulting time for executing corrective action is derived from the relationship between work and object energy.

The lift produced by the aircraft during slow motions can be ignored.

Braking distance is derived from the relation between work and energy.

Distance of uniformly decelerated motion is determined by substitution.

An equation for determining a resulting time needed to decelerate the aircraft at a given braking force is used to define the time needed to stop the aircraft during the high speed taxi in the vicinity of the runway, as well as for determination of time to stop while the aircraft is being pushed back out of the gate.

Figures 1, 5:
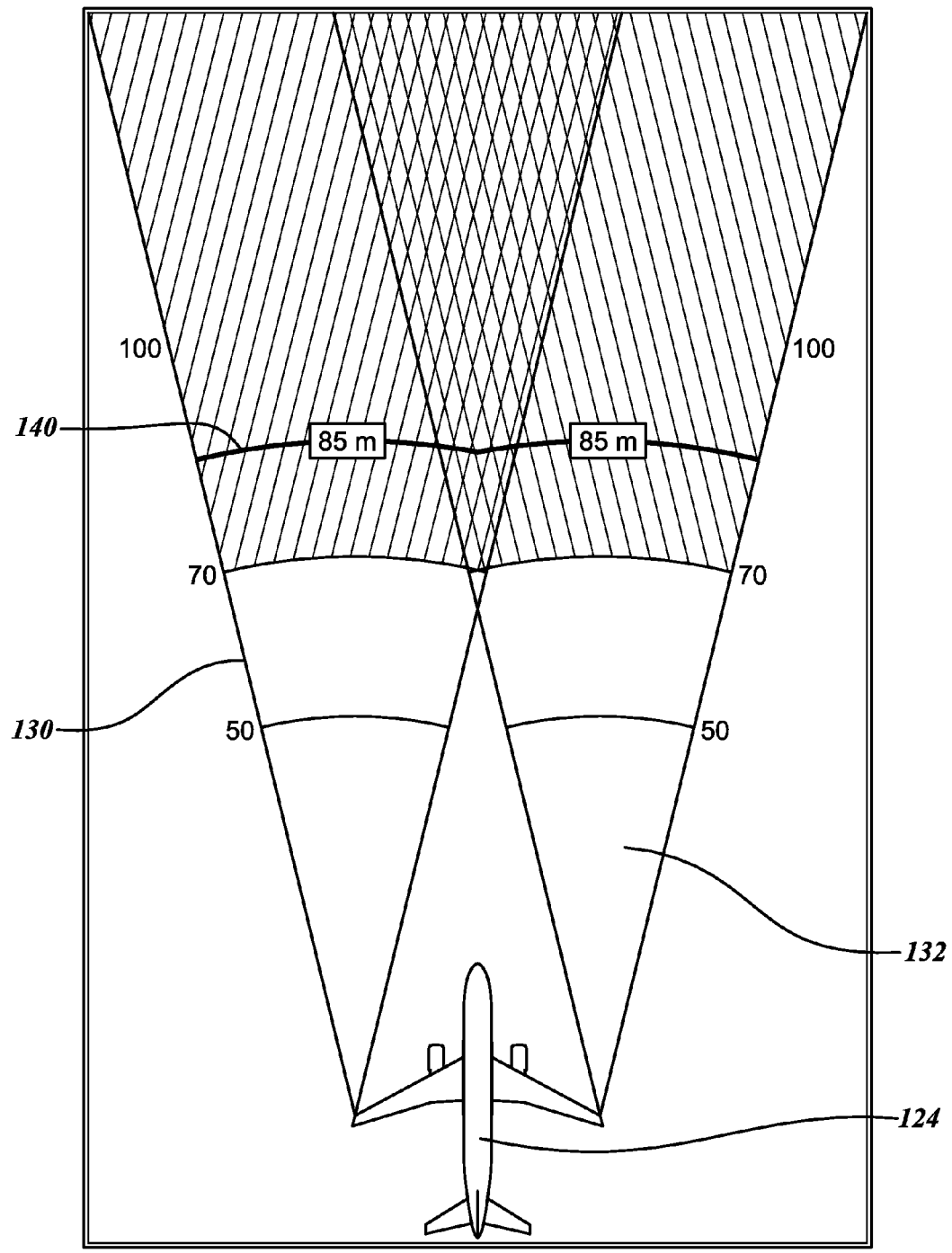
Figures 2, 5:
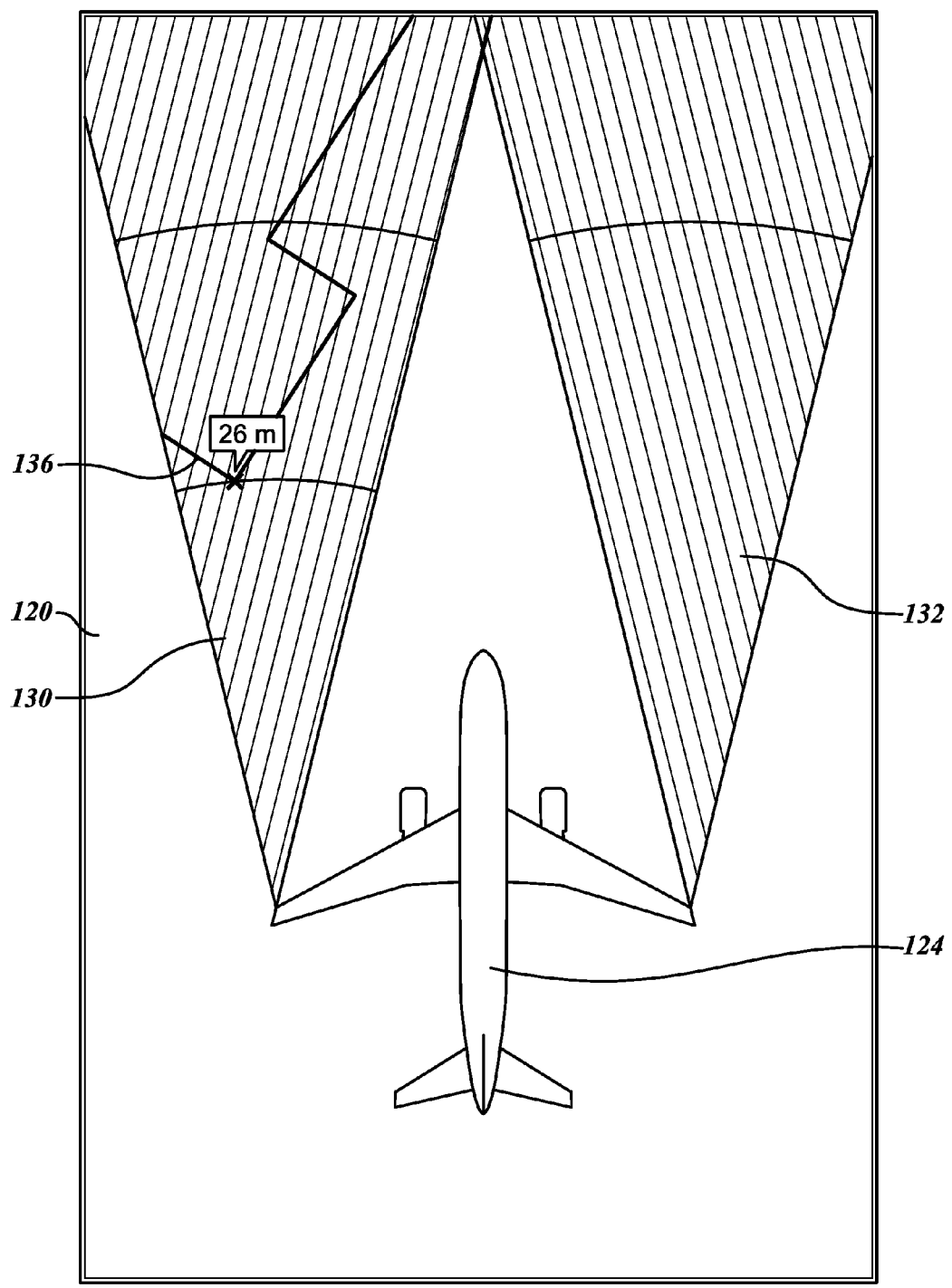

FIG. 5-1 shows a screen shot of an exemplary image 120-1 of a wingtip sensor display at a normal range setting. The image 120-1 is presented on the cockpit display 54, such as that included on the instrument panel or included in a stand-alone device (e.g., electronic flight bag (EFB)).

The image 120-1 includes an aircraft icon 124 located at a bottom center. Sensor cones 130, 132 emanate from the wingtips (i.e., sensors) of the aircraft icon 124. A distance scale is identified on the cones 130, 132. In this example, the scale includes meter measurements of 50, 70, 90, 100, and 110 measured from either the aircraft's nose or wingtip. In this example, the closest target/obstacle has been identified at 85 m, as identified by the 85 m line 140 being highlighted within the cones 130, 132.

In one embodiment, the 85 m line 140 is highlighted when the sensors in both wingtips identify the nearest target/obstacle at 85 m or only one of the wingtip sensors sees the nearest target/obstacle at 85 m.

FIG. 5-2 shows a screen shot of an exemplary image 120-2 that is similar to the image 120-1, except that it presents a closer range than does the image 120-1. The aircraft icon 124 appears larger and the cones 130, 132 extend out to only about 70 m. The image 120-2 is presented when the user selects the close-range (precision) display mode or the system 18 has determined that there is a target/obstacle located within a threshold distance (e.g., 70 m) from the aircraft. The system 18 has detected a target/ obstacle at 26 m based on information from the port wingtip sensor. The image 120-2 shows the detected target/obstacle by either highlighting the 26 m distance line, displaying a 26 m call-out balloon, and/or displaying at least a partial outline image 136 of the detected target/obstacle. For example, the system 18 detects an airport building. Based on airport facility information stored in the memory 58, the outline image 136 is provided to accurately present an outline of the associated building based on the range setting of the image 120-2.

In one embodiment, one power source is shared for both the radars (forward and aft) and the wireless module. In one embodiment, the common wireless module is placed in the forward position light and is used for transmitting data between the wing and the cockpit UI device or the tug tractor driver/wing-walker UI device.

Wingtip velocity in a taxi turn may reach 8 meters per second (27 fps) and, in one embodiment, the minimum time for alerting and action by the pilot is set at eight seconds. In one embodiment, the system derives a taxi ground speed related to the wingtip, in order to advance the detection time.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method comprising:
   at a transceiver located on an aircraft, generating reflectivity data based on an associated emission of signals;
   at a processor, determining a speed and a trajectory of a wingtip light module of an aircraft; determining dimensions of a three-dimensional envelope based on the speed and the trajectory of the wingtip light module, and based on predefined vertical boundary information;
   and determining targets if a portion of the generated reflectivity data within the dynamically defined three-dimensional envelope is greater than a predefined threshold; and on a display device, presenting an indication of a nearest target at the associated distance range relative to the aircraft by at least:
   generating, by the processor, a first range overhead display comprising an aircraft icon in response to determining the nearest target is farther than a threshold distance from the aircraft;
   and generating, by the processor, a second range overhead display comprising an aircraft icon in response to determining the nearest target is closer than the threshold distance from the aircraft.

2. The method of claim 1, wherein the first range overhead display comprises one or more sensor cones beginning at the respective wingtip of the aircraft icon, and the second range overhead display comprises one or more sensor cones beginning at the respective wingtip of the aircraft icon, and the threshold distance is based on maximum and minimum stopping distances of the aircraft.

3. The method of claim 2, wherein the one or more sensor cones of the first range overhead display have a greater range than the one or more sensor cones of the second range overhead display.

4. The method of claim 2, wherein the one or more sensor cones comprise one or more range lines located previously designated distances from at least one of the aircraft or the associated wingtip.

5. The method of claim 4, wherein presenting the indication of the nearest target comprises highlighting a range line of the one or more sensor cones that is associated with the reflectivity data comprising the nearest target.

6. The method of claim 4, wherein presenting the indication of the nearest target comprises highlighting a distance value associated with the reflectivity data identifying the nearest target.

7. The method of claim 4, further comprising at the processor, determining the nearest target comprises an airport structure, wherein presenting the indication of the nearest target comprises presenting at least a partial outline of a corresponding airport structure based on previously stored airport information in response to determining the nearest target comprises the airport structure.

8. The method of claim 1, wherein the transceiver is located at one or more wingtip light modules of the aircraft.

9. A system located on an aircraft, the system comprising:
   a transceiver configured to generate reflectivity data based on an associated emission of signals; a processor configured to: determine a speed and a trajectory of a wingtip light module of the aircraft, determine dimensions of a three-dimensional envelope based on the speed and the trajectory of the wingtip light module, and based on predefined vertical boundary information;
   and determine targets if a portion of the generated reflectivity data within the dynamically defined three-dimensional envelope is greater than a predefined threshold; and a display device, wherein the processor is configured to present, via the display device, an indication of a nearest target at the associated distance range relative to the aircraft, the processor being configured to generate the indication by at least generating a first range overhead display comprising an aircraft icon in response to determining the nearest target is farther than a threshold distance from the aircraft, and generating a second range overhead display comprising an aircraft icon in response to determining the nearest target is closer than the threshold distance from the aircraft.

10. The system of claim 9, wherein: the first range overhead display comprises one or more sensor cones beginning at the respective wingtip of the aircraft icon; and the second range overhead display comprises one or more target cones beginning at the respective wingtip of the aircraft icon.

11. The system of claim 10, wherein the one or more sensor cones of the first range overhead display have a greater range than the one or more sensor cones of the second range overhead display.

12. The system of claim 10, wherein the one or more sensor cones comprise one or more range lines located previously designated distances from at least one of the aircraft or the associated wingtip.

13. The system of claim 12, wherein the processor is configured to control the display device to present the indication of the nearest target by at least highlighting a range line of the one or more sensor cones that is associated with the reflectivity data comprising the nearest target.

14. The system of claim 12, wherein the processor is configured to control the display device to present the indication of the nearest target by at least highlighting a distance value associated with the reflectivity data identifying the nearest target.

15. The system of claim 12, wherein the processor is further configured to determine the nearest target comprises an airport structure and control the display device to present the indication of the nearest target by at least presenting at least a partial outline of a corresponding airport structure based on previously stored airport information in response to determining the nearest target comprises the airport structure.

16. The system of claim 9, further comprising one or more wingtip light modules, each of the one or more wingtip light modules being configured to contain the transceiver.

17. The method of claim 1, wherein determining the speed and the trajectory of the wingtip light module of the aircraft comprises deriving the speed and the trajectory of the wingtip light module of the aircraft based on a speed and a trajectory of the aircraft.

18. The system of claim 9, wherein the processor is configured to determine the speed and the trajectory of the wingtip light module of the aircraft by at least deriving the speed and the trajectory of the wingtip light module of the aircraft based on a speed and a trajectory of the aircraft.

19. The system of claim 9, wherein the processor is configured to determine the dimensions of the envelope based on the speed and the trajectory of the wingtip light module of the aircraft, the wingspan of the aircraft, and the predefined vertical boundary information.

20. The system of claim 10, wherein the threshold distance is based on maximum and minimum stopping distances of the aircraft.

* * * * *